United States Patent [19]

Ahlén et al.

[11] Patent Number: 4,559,849
[45] Date of Patent: Dec. 24, 1985

[54] POWER SHIFT PLANETARY GEAR TRANSMISSION

[75] Inventors: Karl-Gustav Åhlén, Bromma; Per-Olof Bergström, Nacka; Hans Å. Wallgren, Vällingby, all of Sweden

[73] Assignee: S.R.M. Hydromekanik Aktiebolag, Stockholm, Sweden

[21] Appl. No.: 276,492

[22] Filed: Jun. 23, 1981

[30] Foreign Application Priority Data

Nov. 13, 1980 [GB] United Kingdom ............... 8036495
Dec. 24, 1980 [DE] Fed. Rep. of Germany ....... 3048990

[51] Int. Cl.⁴ ............................................. F16H 57/10
[52] U.S. Cl. ........................................ 74/761; 74/740; 74/769
[58] Field of Search ............... 74/740, 760, 761, 768, 74/769

[56] References Cited

U.S. PATENT DOCUMENTS

| | | | |
|---|---|---|---|
| 3,021,729 | 2/1962 | Chambers et al. | 74/768 |
| 4,077,280 | 3/1978 | Kress et al. | 74/760 |
| 4,077,281 | 3/1978 | Michael | 74/760 |
| 4,142,425 | 3/1979 | Ahlen et al. | 74/760 |
| 4,214,489 | 7/1980 | Ahlen et al. | 74/760 |
| 4,314,487 | 2/1982 | Ahlen | 74/740 |
| 4,328,716 | 5/1982 | Ahlen et al. | 74/760 |
| 4,391,163 | 7/1983 | Benthake et al. | 74/768 |
| 4,453,430 | 6/1984 | Sell | 74/740 X |

FOREIGN PATENT DOCUMENTS

| | | | |
|---|---|---|---|
| 2733558 | 2/1979 | Fed. Rep. of Germany | 74/761 |
| 1231312 | 9/1960 | France | 74/740 |
| 743814 | 1/1956 | United Kingdom | |
| 975809 | 11/1964 | United Kingdom | |
| 1008307 | 10/1965 | United Kingdom | |
| 1050283 | 12/1966 | United Kingdom | |
| 1421650 | 1/1976 | United Kingdom | |
| 1525593 | 9/1978 | United Kingdom | |
| 2010992 | 7/1979 | United Kingdom | |

*Primary Examiner*—Leslie A. Braun
*Assistant Examiner*—Joseph M. Rolnicki
*Attorney, Agent, or Firm*—Larson and Taylor

[57] ABSTRACT

A planetary gear transmission having at least two different gearing diameters, the pinions of which are journalled independently of each other so that they can have a large gear ratio step between them; and a multi-speed transmission including first and second planetary gear sets, the second of which sets is the planetary gear transmission having the two different gearing diameters journalled independently of each other. In the multi-speed transmission, the gear ratio steps of the second planetary gear set each exceed the highest gear ratio of the first planetary gear set.

16 Claims, 10 Drawing Figures

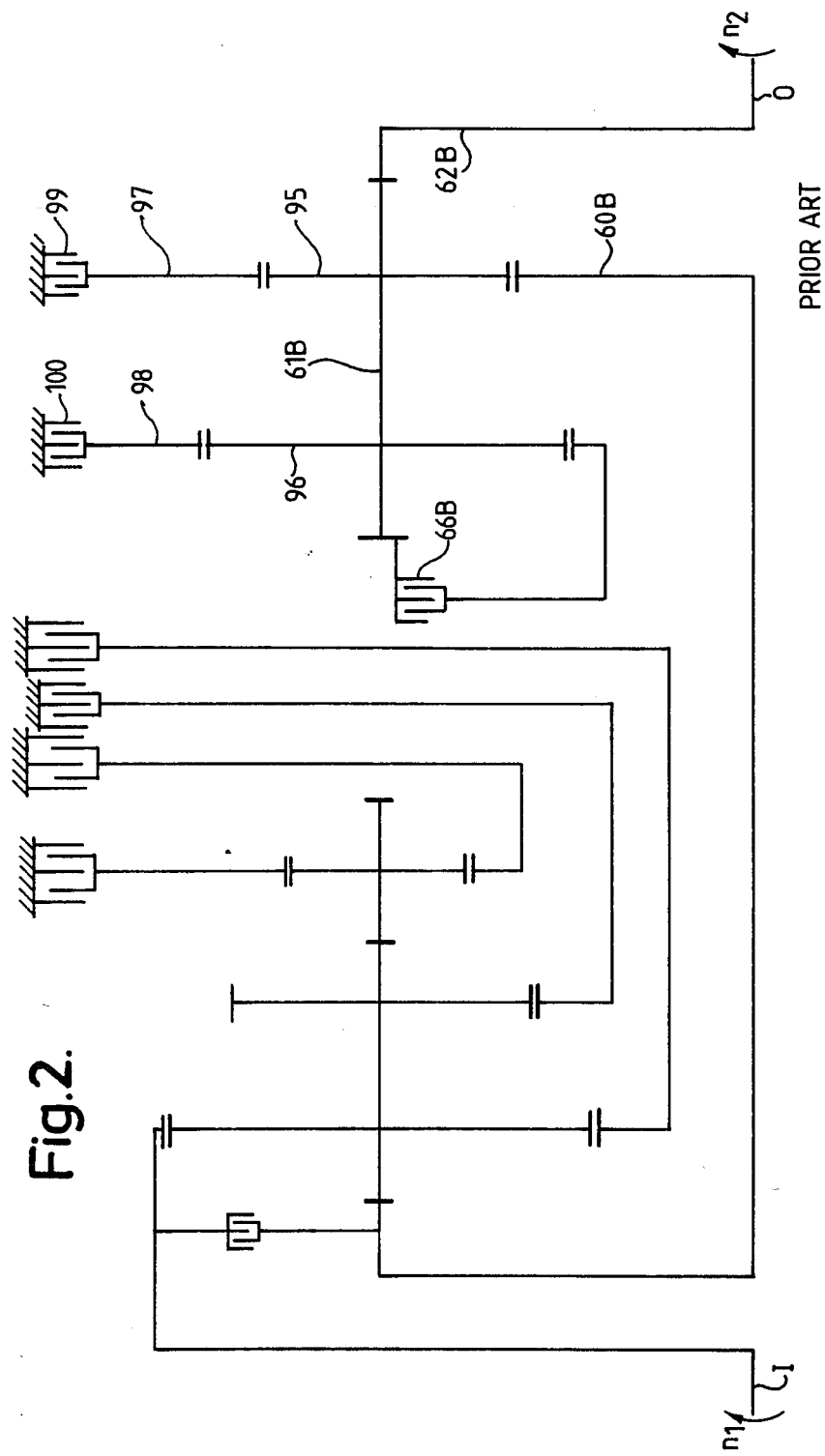

POWER SHIFT PLANETARY GEAR TRANSMISSION

This invention relates to a multi-speed power shift planetary gear transmission which is especially suitable for use with buses, lorries, earthmoving equipment and military vehicles. More particularly, the invention relates to a 9- to 12-speed transmission of the power shift type comprising a first planetary gear set in combination with a range planetary gear set for multiplying the gear ratios of the first set.

The present invention is a further development of the transmission as shown in commonly owned U.S. Pat. No. 4,142,425, the purpose of the present invention being to provide a relatively small multi-speed power shift planetary gear transmission which, with a minimum number of changes in structure, can be adapted to provide a wide range of gear ratios necessary for a "range" planetary gear set. Another purpose of the present invention is to provide such an improved planetary gear transmission which has certain characteristics of the transmission as shown in said commonly owned U.S. Pat. No. 4,142,425 and commonly owned U.S. patent application Ser. No. 843,521, filed Oct. 19, 1977.

According to the present invention, there is provided a multi-speed planetary gear transmission suitable for use with buses, lorries, earthmoving equipment and military vehicles comprising first and second planetary gear sets arranged in series, each set comprising a planetary gear carrier having associated planetary pinions spaced around its axis. In each of the two planetary gear sets, the planetary pinions include at least two gearings of different diameters, and in each planetary gear set, the planetary pinions mesh with at least three sun and/or ring gears, which shall be referred to below generically as "centrally disposed gears", and at least one of the said sun and/or ring gears comprises the input member of that planetary gear set while the carrier for the planetary pinions comprises the output from that planetary gear set. Each of the remaining sun and/or ring gears of that set have associated therewith a friction brake controlled by a servo motor stationarily mounted in the housing; and wherein the two different gearing diameters on the planetary pinions of the second gear set are driven from the secondary side of the first planetary gear set, and wherein each of the two different diameters of the planetary pinions of the second gear set are individually journalled on a planetary pinion holder which constitutes the output member for the second planetary gear set.

The multi-speed planetary gear transmission of the present invention includes a first section having a number of gear trains in parallel with each other and a second section which utilizes the gear trains of the first section a number of different times, which in turn requires that each gear step in the second section have a relatively large gear ratio. The type of planetary gear sets having such a relatively large gear ratio between each step is generally called a "range" gear, because it multiplies the range of the gear steps of the first section. By way of definition, another way to multiply the number of gear steps of a first section is to provide an additional section which includes steps smaller than the steps of the first section so that it divides each step of the first section into a plurality of different steps. Such a transmission is commonly referred to as a "split" gear. While the present invention is directed to the combination of a first section combined with a range gear, it will be understood that the present invention can also be used in combination, i.e. in series with a split gear type of transmission.

Preferably, in accordance with the present invention, the first planetary gear set will have three or four gear steps, and the second planetary gear set will have three steps. A transmission will therefore have nine or twelve gear ratios, depending on whether the first planetary gear set has three or four gear steps.

Commonly owned U.S. Pat. No. 4,142,425 describes a multi-speed planetary gear transmission of the type described above which can produce nine or twelve gear speeds. However, the structure of the second planetary gear set shown in said U.S. patent has certain limitations as to the size of the gear steps. The present invention seeks to overcome these problems.

Another purpose of the present invention is to provide a planetary gear transmission having a larger range of reverse gear ratios.

Still another object of the present invention is to provide a relatively small 9- to 12-speed transmission of the power shift type which also has a relatively low weight as compared to existing 9- or 12-speed transmissions.

These and other objects of the present invention will become apparent from the detailed description to follow, which should be read together with the accompanying drawings wherein.

FIG. 2 shows schematically, for purposes of comparison, a 12-speed planetary gear transmission of the type shown in commonly owned U.S. Pat. No. 4,142,425.

Figure 1:
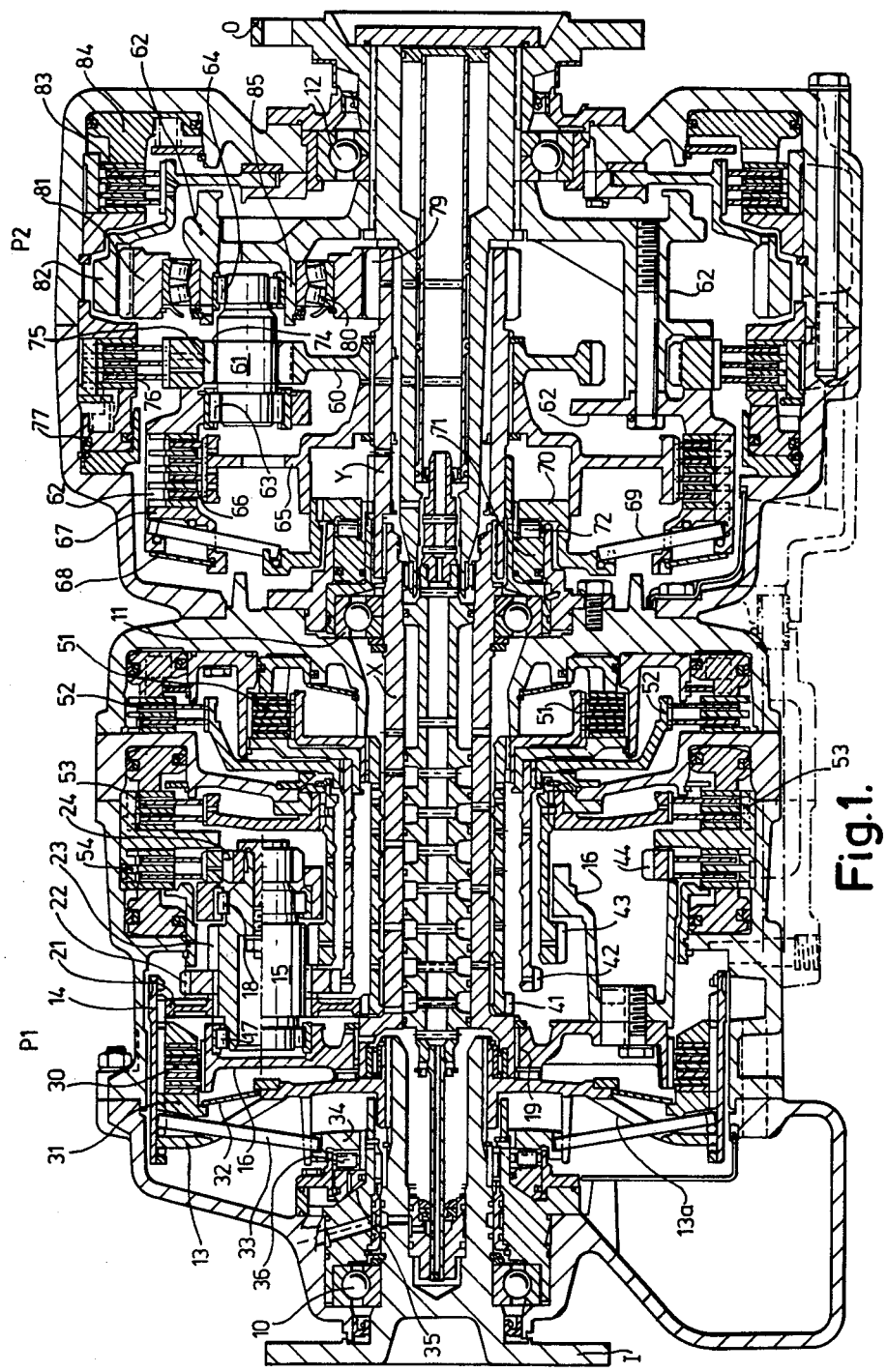
FIG. 1 is a longitudinal sectional view of a 12-speed planetary gear transmission having gear steps of approximately 1.25:1 and a total gear ratio of approximately 11.5:1.
Figure 3:
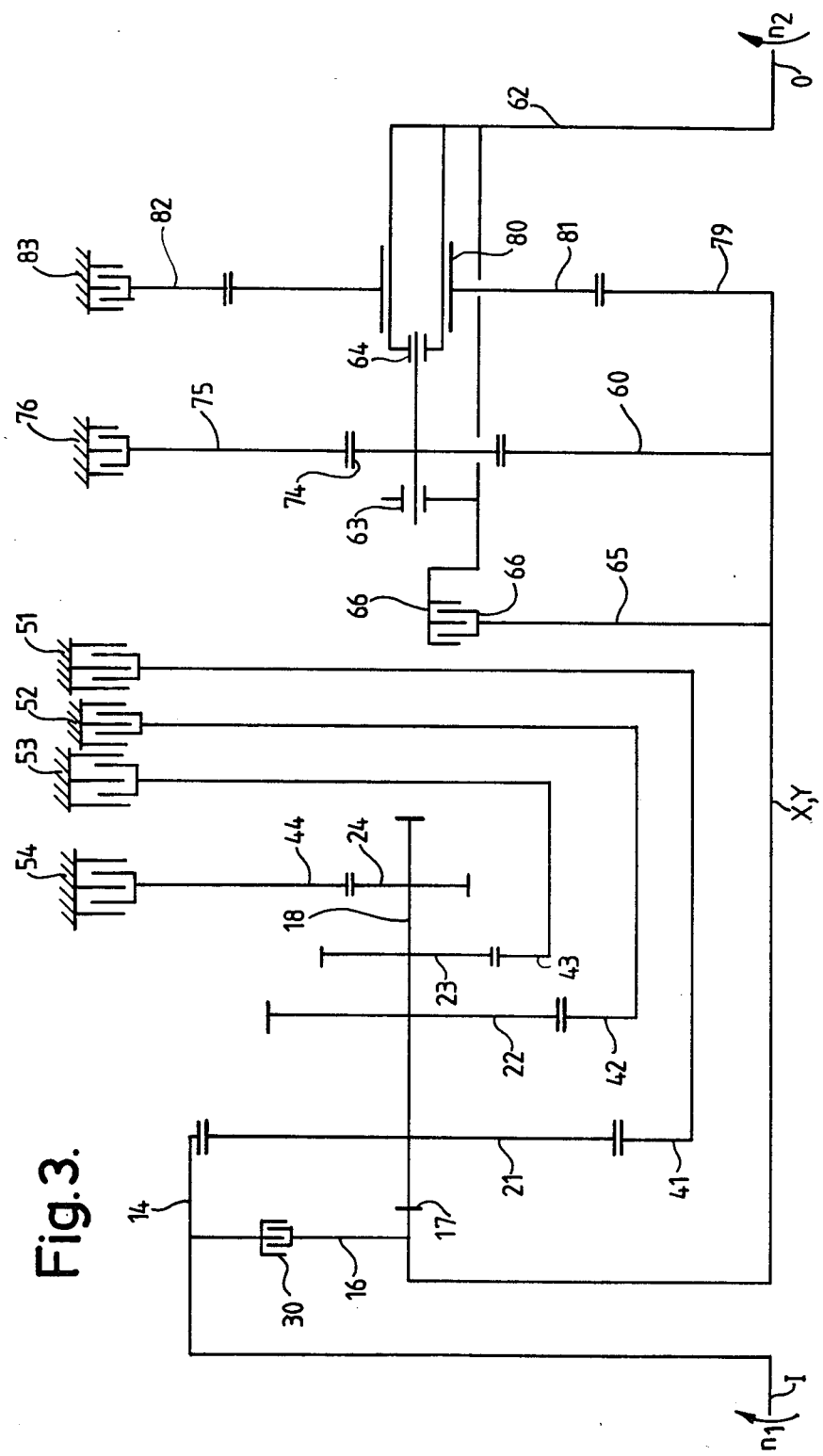

FIG. 3 is a schematic illustration of the planetary gear transmission of FIG. 1.

Figure 1A:
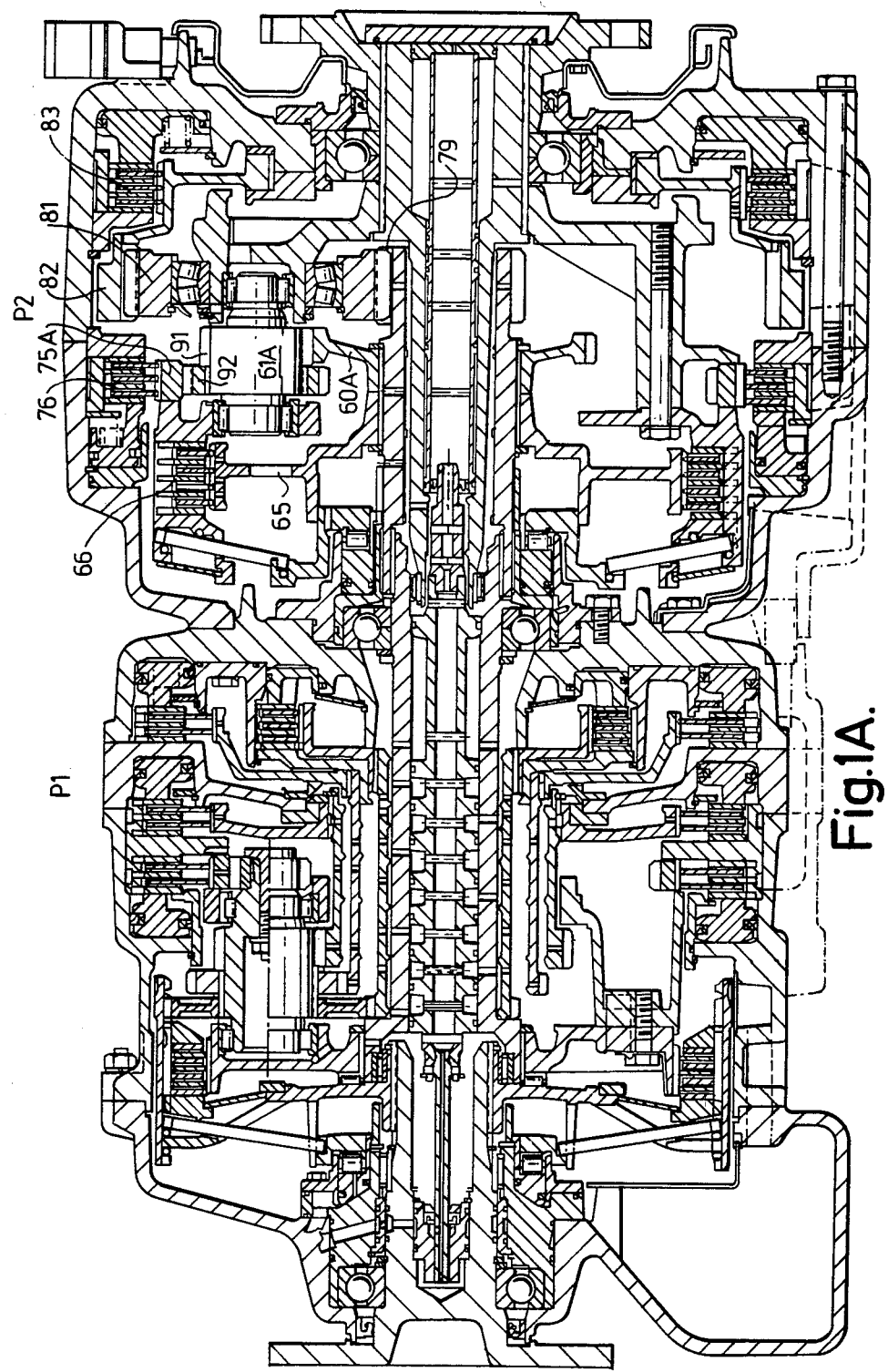
FIG. 1A is a longitudinal cross-sectional view through a planetary gear transmission showing another embodiment of the present invention wherein the second planetary gear transmission is modified in a way which permits greater variation of the gear ratios obtainable in said second planetary gear set.
Figure 4:
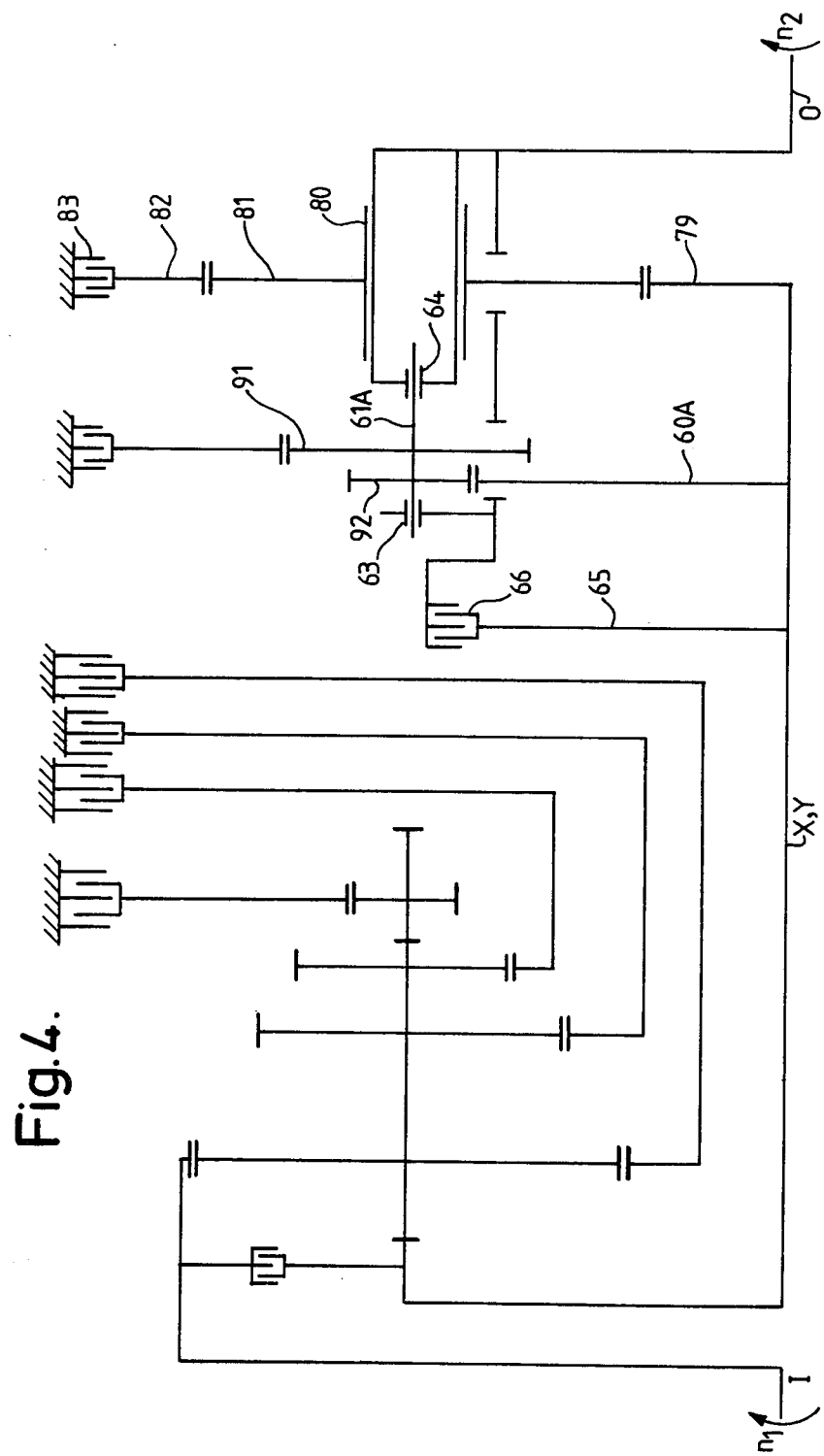

FIG. 4 is a schematic illustration of the planetary gear transmission of FIG. 1A.

Figure 5:
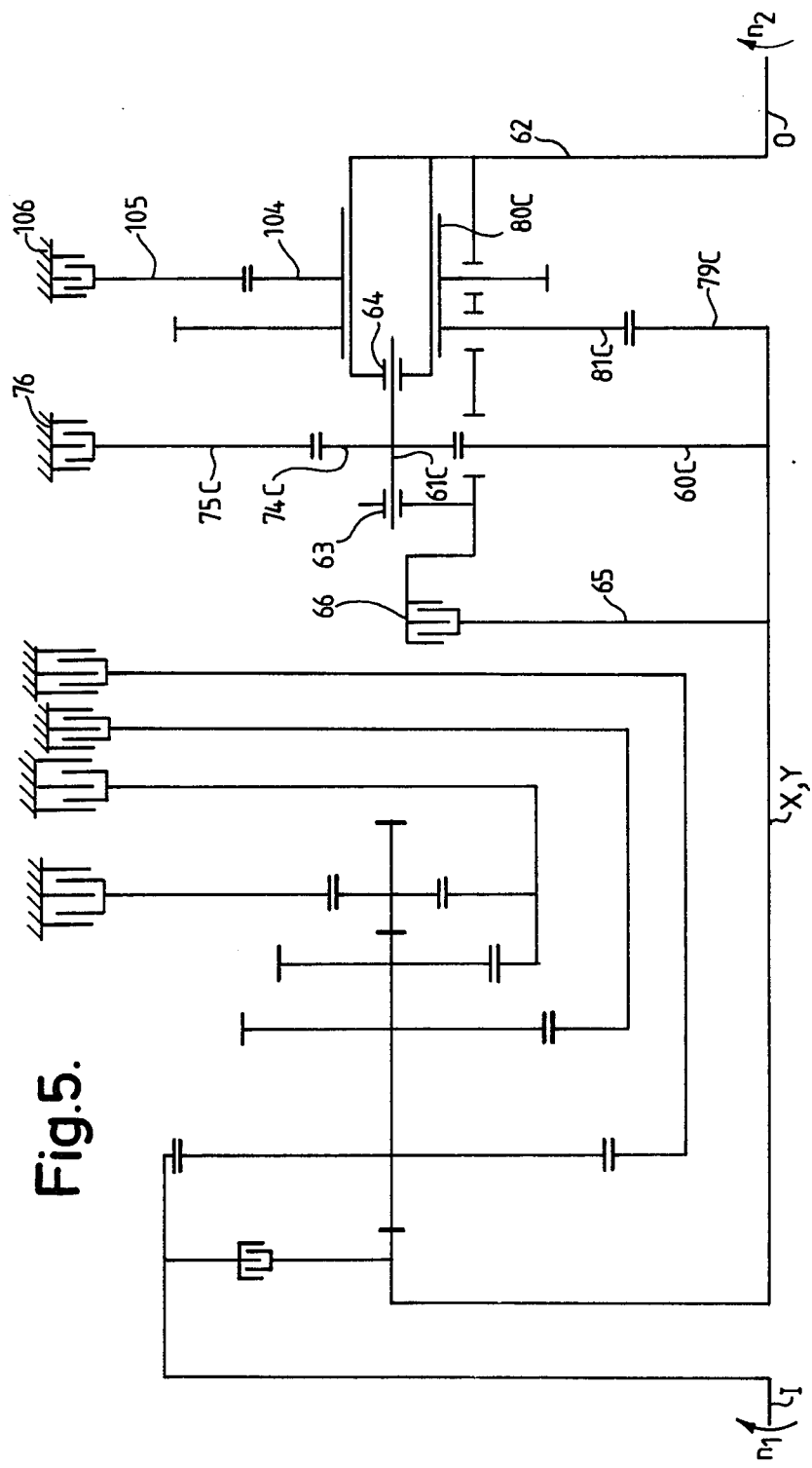

FIG. 5 is a schematic view of a planetary gear transmission showing another embodiment of the present invention wherein another means is illustrated for varying the size of the gear step in the second planetary gear set.

Figure 5A:
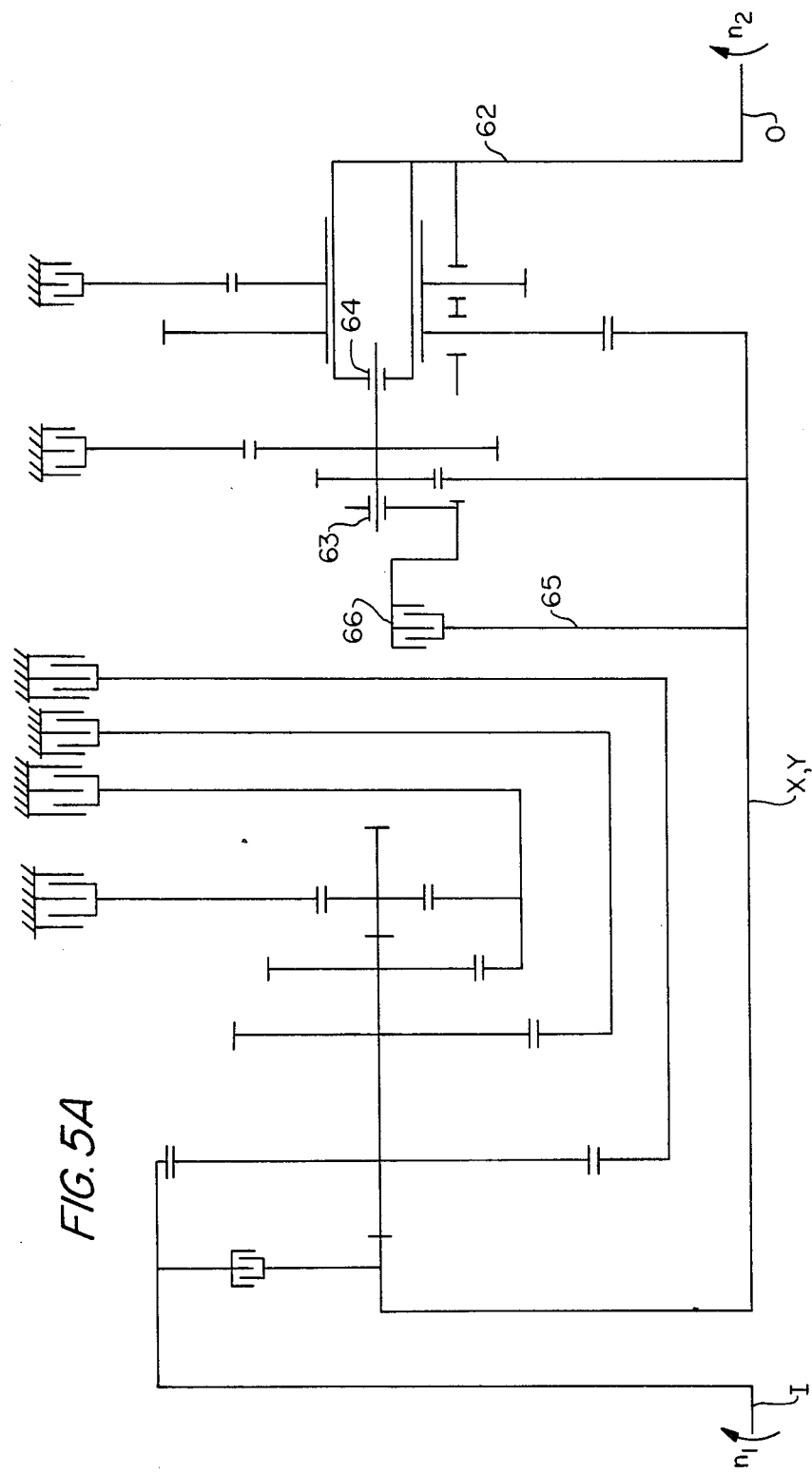

FIG. 5A is a schematic view of a portion of a planetary gear transmission similar to that shown in FIGS. 4 and 5 and showing another embodiment of the present invention which combines the features shown in FIGS. 4 and 5.

Figure 6:
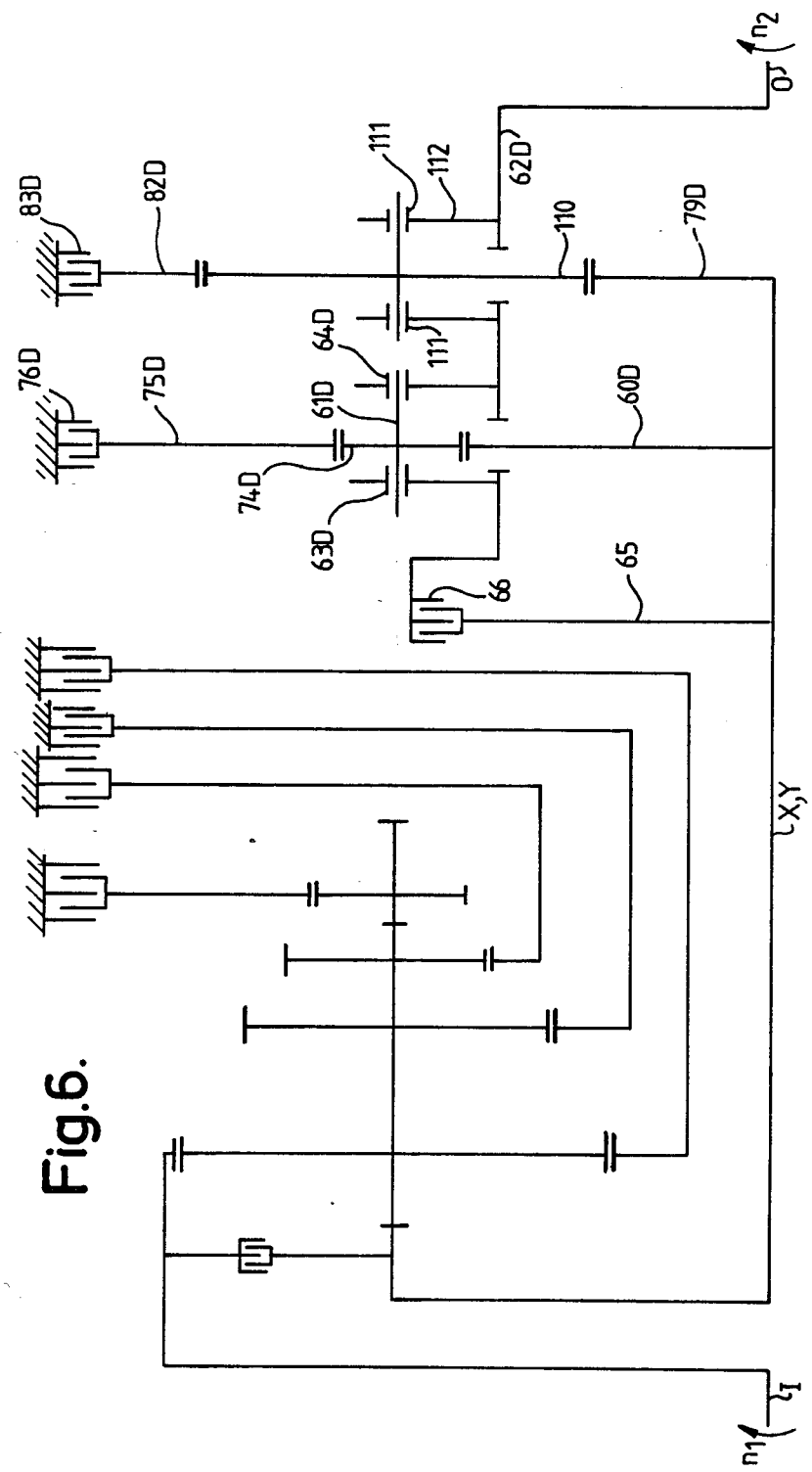

FIG. 6 is a schematic view of a planetary gear transmission according to the present invention and showing another embodiment thereof wherein the bearing structure of the second planetary gear set has been modified.

Figure 7:
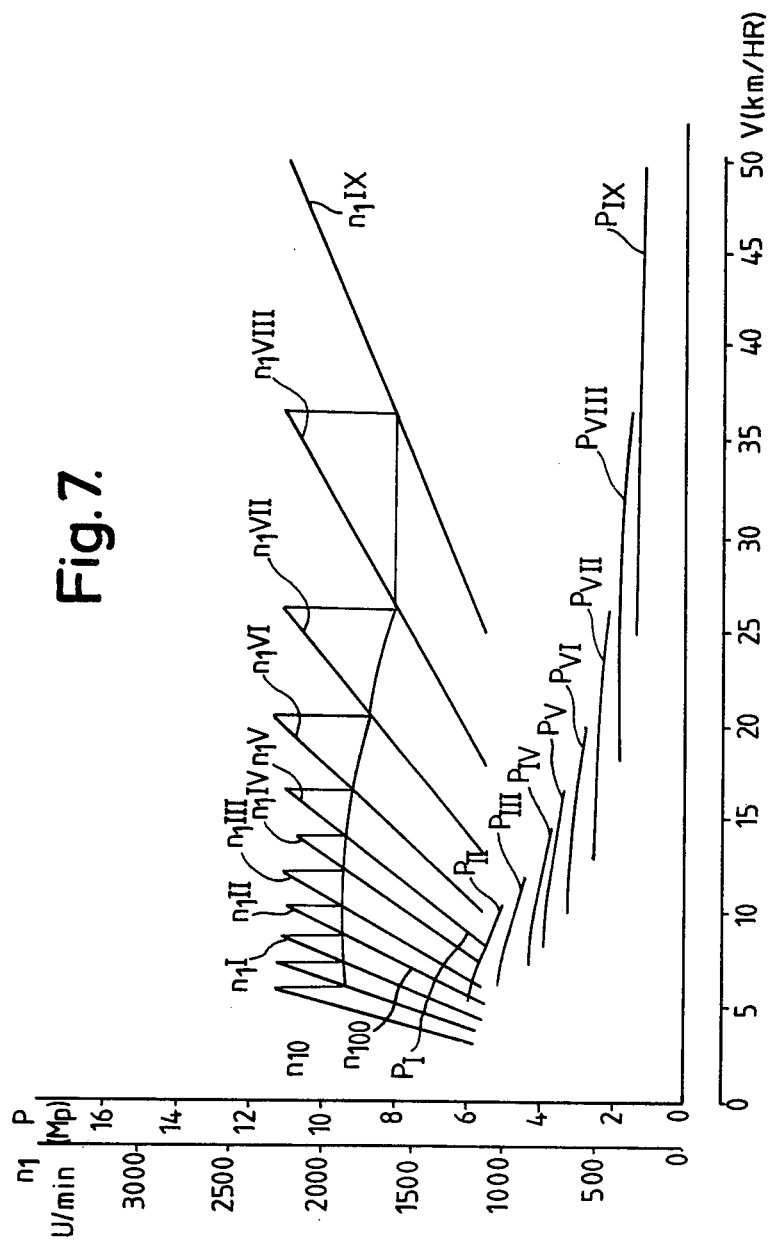

FIG. 7 is a graph showing the gear ratios, the primary speeds and tractive effort obtained with the planetary gear transmission of FIG. 2.

Figure 8:
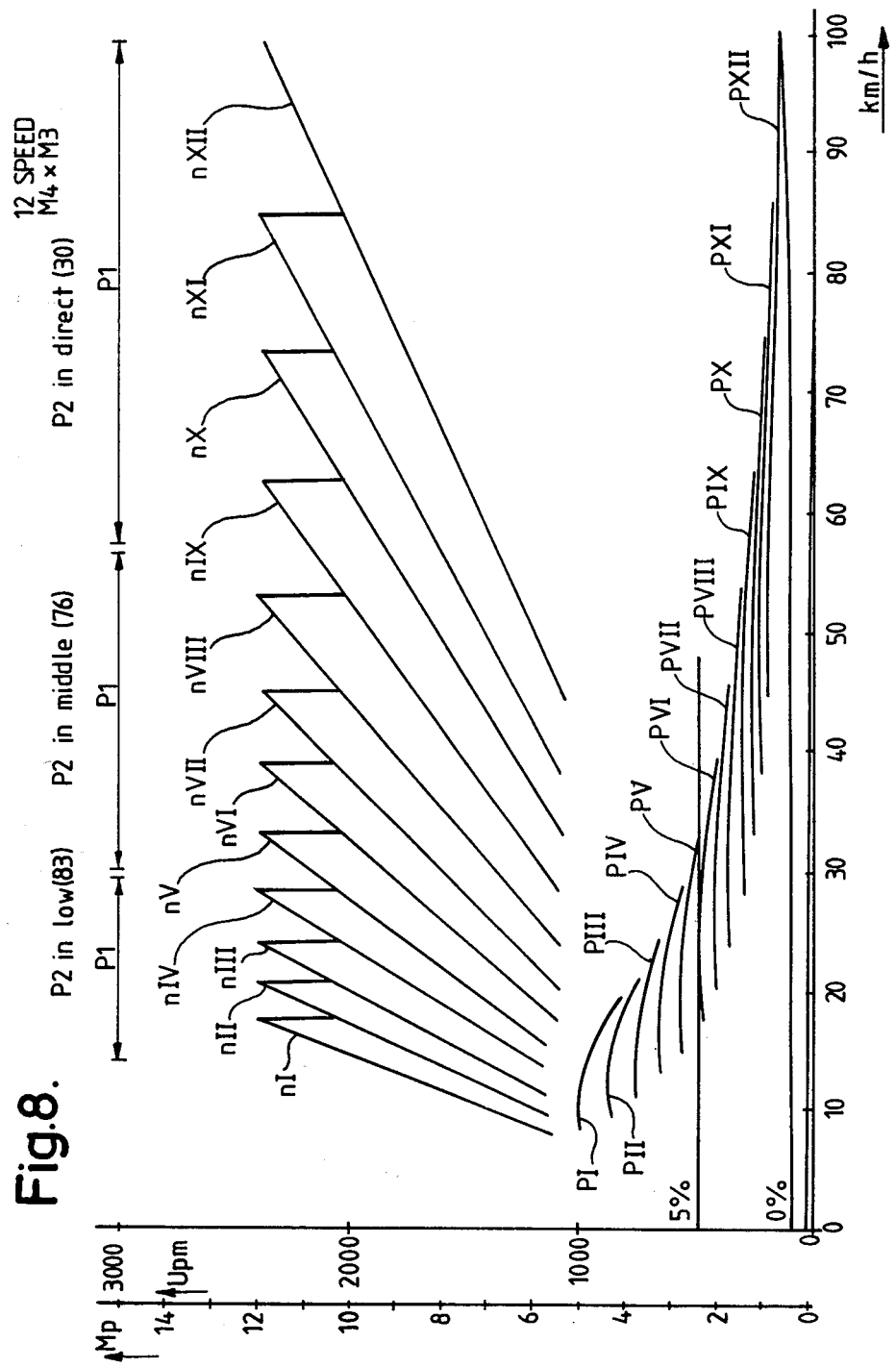

FIG. 8 is a graph showing speed ratios and primary speeds and tractive effort for the planetary gear transmissions shown in FIGS. 3 to 6.

Referring now to the drawings, like elements are represented by like numerals throughout the several views. Although the figures will be described in detail, many specific features will not be described in detail because they are illustrated and described in the said commonly owned U.S. Pat. No. 4,142,425. Sun and ring gears may be referred to below by the generic phrase "centrally disposed gear".

Referring to FIG. 1, as shown schematically in FIG. 3, the planetary gear transmission comprises an input shaft I, an output shaft O with intermediate shafts X and Y. The shafts are supported within the stationary casing by means of bearings 10, 11 and 12. Between the bearings 10 and 11 there is illustrated the first planetary gear set P1 which provides four forward speeds and one reverse speed. Between bearings 11 and 12 there is provided the second planetary set P2 which is a range gear having three forward speeds, no reverse speed, and each of the steps of the second planetary gear set being greater than the total of the steps in the first set P1. In the first set P1 the input is via a ring gear while the output is via the planetary pinion carrier, while in the second set the input is via a sun gear and the output is via the planetary pinion carrier.

The input shaft I is drivingly engaged with a generally disc shaped input member 13 which has an aperature 13a passing therethrough for a purpose to be described below. The outer periphery of disc input member 13 is engaged with longitudinally extending splines on a ring gear 14. Mounted within the planetary gear set P1 and spaced around its axis are a plurality of planetary pinions 15, all of which pinions 15 are mounted in a carrier 16, supported therein by bearings 17 and 18. Pinion 15 includes a large gearing diameter 21, an intermediate gearing diameter 22 and a smaller gearing diameter 23. In this illustration, the gearings 21 and 22 are connected by splines onto the basic cylindrical center of pinion 15 which includes on its periphery the smaller gearing diameter 23. On the other side of bearing 18 there is provided a further gearing diameter 24.

The input shaft I, acting via ring gear 14 provides the input to the planetary gear set P1 via the larger diameter gearing 21. Each of the gearings 21, 22 and 23 have associated therewith a sun gear 41, 42 and 43, respectively, each of which can be braked independently of the other by means of disc brakes 51, 52 and 53, respectively. Illustrated in the figure are stationarily mounted servo motors provided for each of said brakes 51, 52 and 53. The gearing 24 is connected to a ring gear 44 which provides a reverse gear upon braking of brake 54 which is also operated by a servo motor which is stationarily mounted in the housing.

Gear set P1 also includes a direct drive engagement for operatively connecting the input shaft I to the output shaft X. For this purpose, there is provided a direct drive clutch 30 which comprises an annular piston 31 which moves longitudinally on the splines of ring gear 14. A Belleville spring 32 urges piston 31 to the left, in a direction to disengage the direct drive clutch 30. To engage this clutch, there is provided a lever 33 which passes through opening 13a in the disc input member 13. At its lower end, the lever 33 is engaged by element 34 which is a rotatable part of a servo piston. It is abutted by an axial thrust bearing 36, across which is provided element 35 which is the portion of the servo piston which is stationarily mounted in the housing. Such a servo piston is shown in said U.S. Pat. No. 4,142,425, in FIG. 1 thereof.

Shaft section X is connected via a spline to shaft section Y which is drivingly engaged with three separate input members to the second planetary gear set P2, namely input members 60, 65 and 79. The second planetary gear set P2 comprises a plurality of planetary pinions 61 spaced about the axis of the planetary gear set. The pinions are mounted in a carrier 62 (the full extent of which is best illustrated in the lower portion of FIG. 1). Pinions 61 are mounted in the carrier 62 by means of bearings 63 and 64.

Element 65 is a flange disc connected to the shaft section Y to provide an input for direct drive directly between the shaft Y and the carrier 62 and hence the output shaft O. For this purpose, flange disc 65 includes discs which form a part of direct drive clutch 66, the other discs of which are engaged with the carrier 62. Direct drive clutch 66 includes an annular piston 67 which is urged to the disengaged position by a Belleville spring 68. To close the direct drive clutch, the radial inner portion of levers 69 are urged to the right by a servo motor system which, like the system in a planetary gear set P1, includes a rotational portion of the servo motor, 70, an axial thrust bearing, 72, and a stationarily mounted servo part, 71.

For intermediate speed reduction through the planetary gear set P2, there is provided a ring gear 75, the outer portion of which is connected by a spline to discs of a brake 76 operated by a servo motor 77 which is stationarily mounted in the housing.

For the greatest speed reduction through planetary gear set P2, a sun gear 79 of the shaft section Y engages a very large diameter pinion 81 which is mounted, via bearings 80 on a hub shaped portion 85 of the carrier 62. Outwardly of this gear 81 there is provided a ring gear 82 which is operatively connected to a brake 83 which in turn is operated by a servo motor 84 which is stationarily mounted in the housing.

Although not illustrated in detail, it will be understood that all of the stationarily mounted servo motors include suitable means such as spring means or the like for returning the servo motors to the released position upon release of the pressurized fluid behind the servo motor piston.

The following table illustrates the gear ratios through the planetary gear set P1, taken alone, the planetary gear set P2, taken alone, and the combined gear reductions through the overall planetary gear transmission, including twelve forward speeds and three reverse speeds:

|  | Gear Ratio |
|---|---|
| Gear Ratios in P1 | |
| First gear 23 - Sun gear 43 braked by 53 | 1.96:1 |
| Second gear 22 - Sun gear 42 braked by 52 | 1.53:1 |
| Third gear 21 - Sun gear 41 braked by 51 | 1.25:1 |
| Direct Drive - clutch 30 engaged | 1:1 |
| Reverse gear - Ring gear 24 braked by 54 | 1.38:1 |
| Gear Ratios in P2 | |
| First gear 81 - Ring gear 82 braked by 83 | 5.60:1 |
| Second gear 74 - Ring gear 75 braked by 76 | 2.44:1 |
| Direct Drive - Clutch 66 engaged | 1:1 |

| Gear Step | Combined Gear Ratios P1, P2 | | | | Combined Gear Ratio |
|---|---|---|---|---|---|
| | Gears Braked | | Braked Clutch | | |
| | P1 | P2 | P1 | P2 | |
| 1 | 43 | 82 | 53 | 83 | 11.09:1 |
| 2 | 42 | 82 | 52 | 83 | 8.64:1 |
| 3 | 41 | 82 | 51 | 83 | 7.07:1 |
| 4 | — | 82 | 30 | 83 | 5.66:1 |
| 5 | 43 | 75 | 53 | 76 | 4.74:1 |
| 6 | 42 | 75 | 52 | 76 | 3.69:1 |
| 7 | 41 | 75 | 51 | 76 | 3.02:1 |

-continued

| | | | | | |
|---|---|---|---|---|---|
| 8 | — | 75 | 30 | 76 | 2.42:1 |
| 9 | 43 | — | 53 | 66 | 1.96:1 |
| 10 | 42 | — | 52 | 66 | 1.53:1 |
| 11 | 41 | — | 51 | 66 | 1.25:1 |
| 12 | — | — | 30 | 66 | 1.00:1 |
| Reverse 1 | 44 | 82 | 54 | 83 | −7.82:1 |
| Reverse 2 | 44 | 75 | 54 | 76 | −3.34:1 |
| Reverse 3 | 44 | — | 54 | 66 | −1.38:1 |

As will be apparent from the preceeding, the construction of P2 provides relatively large steps between the three gear ratios. This is made possible by the provision of the relatively large gearing 81 which is constructed by mounting the same on bearings journalled on the exterior of a hub portion 85 of the carrier 62. Additionally, a greater variation in gear ratios is provided by constructing the reverse gear 24 in P1 separately from the gearings 21, 22 and 23 which are utilized for forward drive.

Figure 1A and FIG. 4 illustrate a modification of the embodiment of FIGS. 1 and 3 wherein the gearing in planetary gear set P2 is slightly modified. In these figures like numerals represent like parts, but many numerals for like parts have simply been omitted, parts which are similar to FIG. 1 but slightly modified are followed by the letter "A" and new elements are indicated by new numerals 91 and 92.

Specifically, in the embodiment of FIGS. 1A and FIG. 4, the input sun gear 60A meshes with teeth 91 on pinion 61A and there is provided a second gearing 92 mounted separately from 91 adjacent thereto for engagement with the ring gear 75A for providing the second gear step when braked by brake 76. Although the gear ratios as illustrated in FIGS. 1A and 4 are the same as in FIG. 1 and the table above, this embodiment has the advantage that the separated gearings 91 and 92 can allow greater freedom in varying the level of the gear ratio of the second gear.

FIG. 2 illustrates diagrammatically the arrangement as shown in commonly owned U.S. Pat. No. 4,142,425, of which the present invention is an improvement. In the arrangement shown therein, the input sun gear 60B meshes with pinions 61B. There is also provided a direct drive clutch 66B and a carrier 62B. However, in this arrangement both of the gearings 95 and 96 are provided directly on the pinions 61B; and in this construction, there are definite physical limitations on the magnitude of the highest gear ratio, i.e. "first" gear. Since the ratio of each gear step in the range gear (in order to be a true range gear) must be greater than that of the highest reduction ratio (lowest gear) in the first planetary gear set P1, then if the steps in P2 cannot be made very large, it follows that the total range of gear ratios in P1 is limited to smaller levels in the previous arrangement as shown in FIG. 2, i.e. in U.S. Pat. No. 4,142,425, than is possible with the present invention. For example, as described in U.S. Pat. No. 4,142,425, the greatest gear ratio is 5.73:1. In contrast, as is apparent from the above, with the present invention it is possible to achieve a higher gear reduction of 11.09:1. Indeed, to achieve the same high reduction ratio with the embodiment as shown in said U.S. patent, the gearing diameter 96 for the lowest gear would have to be so large that it would not be feasible to mount the same within the diameter of the gear box within a practical installation of the overall transmission. Further, there would be certain definite gear ratio limitations which will not permit proper coverage of the overall field within which it is desired to operate.

A comparison of the relatively narrow field of operation of the transmission shown in U.S. Pat. No. 4,142,425, is shown in the graph of FIG. 7 which is to be compared with the graph of FIG. 8 which illustrates the field for the present invention. As is apparent from FIG. 7, it is not possible to spread the gear ratios sufficiently to obtain twelve different gear ratios since the ratios of gears 95 and 96 overlap with the ratios of the first planetary gear P1. Moreover, due to this overlap, it was not possible to obtain complete multiplication of the gear ranges of the first planetary gear set P1 (as was discussed above) and hence smaller gear steps were obtained at low speeds.

Referring to FIG. 8, these limitations are overcome by the present invention. FIG. 8 shows the gear ratios and the tractive effort for a 12-speed gear. Above the speed range fields are shown the four gear steps, the first section P1 repeated three times, one for each step of the range gear P2. The figure designates which gear ratios should be connected in the second planetary gear set P2 to obtain these fields. In other words, a 4-speed gear set P1 with a range gear set P2 changes the fields of the first gear set P1 in relation to each other to obtain, in principle, three fields with four gear steps each which do not overlap.

FIG. 5 illustrates diagrammatically a modification of the present invention. In this figure, many elements identical to those in previous figures are not designated by numerals, while other identical elements are represented by identical numerals. Certain elements which are similar to those in previous figures are followed by the subscript "C" while new elements are designated by the numerals 104–106.

In FIG. 5, instead of having the single gear 81 engage with both the input sun gear 79 and the annular gear 82, in this case the input sun gear 79C engages a gearing 81C mounted on hub 85 via bearings 80C essentially as in FIG. 1. However, in this case a separate gearing 104 is also provided on the bearings 80C adjacent thereto. It is this gearing 104 which is then engaged with a ring gear 105 which is operated by brake 106. This construction has the advantage of providing a greater design flexibility to vary the magnitude of the reduction ratio through this first gear step of P2 without changing the planetary gear carrier. Rather, it is only necessary to change the design of gearings 79C, 81C, 104 and 105.

FIG. 6 illustrates diagrammatically still another embodiment of the present invention. Most numerals are omitted for elements identical to previous figures, while some elements from the previous figures are used in FIG. 6 to represent identical elements. Certain elements which are similar but slightly different from corresponding elements in earlier views are followed by the subscript D while additional numerals 110 and 111 are used in FIG. 6 to illustrate elements which are new in that figure.

FIG. 6 differs from FIG. 1 by showing a modified journalling arrangement for the second planetary gear set P2. It will be understood that this modification can also be employed in the previously described embodiments. Specifically, in FIG. 6 each of the separate gearings 74D and 110, being separately journalled from each other, need not be coaxial, i.e. the carrier structure can be more complex so that the respective gearings are located at different positions around the axis of the planetary gear set P2. As illustrated in FIG. 6, the first gear (gear having greatest gear reduction ratio) 110 is journalled in a carrier portion 112, journalled thereon at 111, while a separate pinion 74D engaged with input sun gear 60D is journalled in bearings 63D and 64D.

Hence, with the present invention, as shown for example in the four illustrated embodiments, the disadvantages of the prior arrangement of FIG. 2 are overcome by having planetary pinions which are torsionally disconnected and independently journalled in the same planetary pinion carrier and each is driven by its own sun gear. Further, each planetary pinion gearing has its own ring gear on the outer side thereof which is braked to cause operation of that planetary pinion gearing. As noted above, FIG. 6 differs from FIG. 3 in that it not only provides separate journalling of the two planetary pinion gearings of the second planetary gear set, but it also permits the different gearings to be located at different points around the axis of P2.

Also with the features of the present invention, one can more freely select the different gear ratios in the two gear trains associated with the two different diameter gearings of P2 by changing each gear train independently of the other. One can therefore determine both the sequence of operation as well as the magnitude of the gear ratio of these two gear trains of P2 to obtain the correct distribution of gear steps in association with P1, as desired for a specific operation.

The embodiments of FIGS. 4 and 5 illustrate how in either of the two gear trains of P2 one can separate the sun engaging and ring engaging portions and thereby provide a considerably greater design latitude to vary the reduction ratio of that gear step.

Although the invention has been described in considerable detail with respect to preferred embodiments, it will be apparent that the invention is capable of numerous modifications and variations apparent to those skilled in the art, without departing from the spirit and scope of the invention.

We claim:

1. A multi-speed transmission, comprising:
    a casing;
    first and second series connected planetary gear sets, an output shaft of the first set operatively connected to an input shaft of the second set;
    each planetary gear set comprising a planetary pinion carrier which comprises an output member of its planetary gear set, a plurality of planetary pinions mounted in each said carrier;
    each pinion of the first gear set having at least two different gearing diameters having different gear ratios, an input centrally disposed gear meshing with one of the gearing diameters and at least two other centrally disposed gears meshing one with each of the gearing diameters, a brake means for braking each of said other centrally disposed gears relative to the casing;
    the second planetary gear set having at least first and second gearing diameters mounted on a carrier and differing from each other, a separate input sun gear for each of said first and second gearing diameters, at least two ring gears meshing one with each of the first and second gearing diameters, a brake means for braking each of said ring gears relative to the casing, the input shaft of the second planetary gear set being connected to each of said input sun gears, the first and second gearing diameters being journalled on the carrier independently of each other on first and second journal bearings, respectively, which first and second journal bearings are independent of each other and spaced from each other;
    the gear ratio of the said first gearing diameter being greater than the largest gear ratio of the first planetary gear set, and the gear ratio of the said second gearing diameter exceeding the gear ratio of the said first gearing diameter by an amount which also exceeds the largest gear ratio of the first planetary gear set, and wherein the carrier of the second planetary gear set forms a hub portion coaxial with each planetary pinion, a journal bearing for the large gearing diameter being mounted on said hub portion, and said hub portion including a central axial opening, at least a portion of the journal bearings for the smaller gearing diameter located in said opening.

2. A multi-speed transmission according to claim 1, wherein the first planetary gear set has at least three different gearing diameters, the input centrally disposed gear thereof being a ring gear meshing with the largest gearing diameter, and the other centrally disposed gears comprising a sun gear meshing one with each of the three gearing diameters, and a said friction brake for each of said sun gears.

3. A multi-speed transmission according to claim 2, said other centrally disposed gears of the first planetary gear set including a further ring gear meshing with one of the gearing diameters other than the largest gearing diameter to provide a reverse drive, and a said friction brake for said further ring gear.

4. A multi-speed transmission according to claim 1, said second planetary gear set further including a direct drive clutch for connecting the input shaft of the second planetary gear set with the carrier thereof for direct drive therethrough.

5. A multi-speed transmission according to any one of claims 1, 2, 3 or 4 including a direct drive clutch means in said first planetary gear set for connecting the input shaft thereof to the said carrier thereof for direct drive therethrough.

6. A multi-speed transmission according to claim 1, wherein the said smaller gearing diameter of the second planetary gear set has two gear surfaces of different diameters, its said sun input gear meshing with the smaller gear surface, and wherein its respective ring gear, meshes with the other gear surface.

7. A multi-speed transmission according to claim 1, wherein the said larger gearing diameter of the second planetary gear set has two gear surfaces of different diameters, said sun input gear thereof meshing with the larger gear surface thereof, and wherein its respective ring gear, meshes with the other gear surface.

8. A multi-speed transmission according to claim 1, wherein each of the smaller and larger gearing diameters have two gear surfaces of different diameters, the sun input gear for the smaller gearing diameter meshing with the smaller gear surface, the sun input gear for the larger gearing diameter meshing with the larger gear surface, and the ring gears associated with each gearing diameter meshing with the other gear surface thereof.

9. A multi-speed transmisison according to claim 1, the journal bearing for the large gearing diameter mounted generally in the same radial plane with the said portion of the journal bearing for the smaller gearing diameter.

10. A multi-speed transmission according to claim 1, wherein the large and small gearing diameters of the second planetary gear set are coaxial.

11. A planetary gear transmission comprising:
a casing,
an input shaft rotatably mounted in the casing,
a carrier rotatably mounted in the casing and comprising an output member of the planetary gear transmission,
a plurality of planetary pinions mounted in the said carrier and spaced about the axis of the planetary gear transmission, each said planetary pinion comprising at least two different gearing diameters,
a first sun gear connected to the input shaft and meshing with the smaller gearing diameter, a second sun gear connected to the input shaft and meshing with the larger gearing diameter, at least two ring gears meshing one with each of the first and second gearing diameters, a brake means for braking each of said ring gears relative to the casing, and each of the two gearing diameters being journalled on the carrier independently of each other on first and second journal bearings, respectively, the first and second journal bearings being independent of each other,
a direct drive clutch means for connecting the input shaft and the carrier for direct drive, said clutch means including an element directly connecting the said input shaft to the said direct drive clutch,
said carrier forming a hub portion coaxial with each planetary pinion, a journal bearing for said larger gearing diameter being mounted on said hub portion and said hub portion including a central axial opening, at least a portion of the journal bearing for the smaller gearing diameter located in said opening.

12. A planetary gear transmission according to claim 11, the smaller gearing diameter having two gear surfaces of different diameters, and its said sun input gear meshing with the smaller gearing diameter, and wherein its respective ring gear, meshes with the other gear surface thereof.

13. A planetary gear transmission according to claim 11, wherein the said larger gearing diameter has two gear surfaces of different diameters, said sun input gear thereof meshing with the larger gear surface thereof, and wherein its respective ring gear, meshes with the other gear surface.

14. A planetary gear transmission according to claim 11, wherein each of the smaller and larger gearing diameters have two gear surfaces of different diameters, the sun input gear for the smaller gearing diameter meshing with the smaller gear surface, the sun input gear for the larger gearing diameter meshing with the larger gear surface, and the ring gears associated with each gearing diameter meshing with the other gear surface thereof.

15. A planetary gear transmission according to claim 11, the journal bearing for the large gearing diameter mounted generally in the same radial plane with the said portion of the journal bearing for the smaller gearing diameter.

16. A planetary gear transmission according to claim 11, wherein the different gearing diameters are coaxial.

* * * * *